Figure 1:

United States Patent [19]

Tommis et al.

[11] Patent Number: 4,715,422
[45] Date of Patent: Dec. 29, 1987

[54] REINFORCEMENT OF ARTICLES OF CAST METAL OR METAL ALLOY

[75] Inventors: Norman Tommis, Bradford; James A. Cooper, Lutterworth, both of England

[73] Assignee: AE PLC, Warwickshire, England

[21] Appl. No.: 852,099

[22] Filed: Apr. 14, 1986

[63] Continuation-in-part of Ser. No. 653,219, filed as PCT GB84/00009 Jan. 16, 1984, published as WO84/02927 on Aug. 2, 1984, abandoned.

Related U.S. Application Data

[63] Continuation-in-part of Ser. No. 653,219, Sep. 18, 1984, abandoned.

[30] Foreign Application Priority Data

Jan. 18, 1983 [GB] United Kingdom ............... 8301320

[51] Int. Cl.[4] ............................................. B22D 19/14
[52] U.S. Cl. ..................................... 164/97; 264/63; 501/95; 29/156.5 R
[58] Field of Search .................... 164/97, 108, 110; 264/63; 501/95; 29/156.5 R

[56] References Cited

U.S. PATENT DOCUMENTS 4,312,398  1/1982  Van Blunk .................... 164/112

FOREIGN PATENT DOCUMENTS

| 0064411 | 11/1982 | European Pat. Off. | 164/108 |
| 51-25211 | 7/1976 | Japan | 164/97 |
| 54-70333 | 6/1979 | Japan | 501/95 |
| 0111565 | 9/1981 | Japan | 164/97 |
| 2033805 | 5/1980 | United Kingdom | 164/97 |
| 2106433 | 4/1983 | United Kingdom | 164/97 |

*Primary Examiner*—Kuang Y. Lin
*Attorney, Agent, or Firm*—Leydig, Voit & Mayer

[57] ABSTRACT

Milled silica or alumina fibres or whiskers are formed into a reinforcement for a squeeze cast article such as a piston for an internal combustion engine. The problem of handling the milled fibres or whiskers while they are formed into the reinforcement is mitigated or overcome by the use of coagulated latex to bind the milled fibres or whiskers in a colloidal silica solution until they are fired to form the reinforcement. In addition, a starch is used to prevent the milled fibres or whiskers settling when in the colloidal silica solution.

8 Claims, 8 Drawing Figures

REINFORCEMENT OF ARTICLES OF CAST METAL OR METAL ALLOY

This application is a continuation-in-part of application Ser. No. 653,219, filed Sept. 18, 1984, and now abandoned.

This invention relates to the reinforcement of articles of cast metal or metal alloy.

Many articles are formed from cast metal or metal alloys, such as aluminium or aluminium alloys, which are light in weight and inexpensive to produce. Such metals or metal alloys have, however, certain disadvantageous physical properties such as an inability to resist elevated temperatures and/or comparatively low resistance to wear.

For this reason, it has been proposed to reinforce such articles with a material which has improved characteristics in relation to the metal or metal alloy. For example, it has been proposed to provide reinforcements of ferrous or ceramic materials in articles of cast aluminium or aliminium alloy to provide the articles with increased resistance to elevated temperatures and/or increased resistance to wear. These reinforcements are generally themselves solid castings or mouldings and have the disadvantage that they can be difficult to incorporate into the article of cast metal or metal alloy and that they increase substantially the weight of the article of cast metal or cast metal alloy.

In order to overcome this difficulty, it has more recently been proposed to reinforce articles of cast metal or cast metal alloy by incorporating in them fibres or whiskers or a reinforcing material. Although such fibres or whiskers are inherently very strong, their incorporation into articles of cast metal or metal alloy has proved difficult because of the problem of holding the fibres or whiskers relatively to one another in a require shape before their incorporation into the article of cast metal or metal alloy.

One previous proposal for overcoming this problem is disclosed in European Patent Specification No. 0094970. In this specification, the fibres or whiskers are first soaked in colloidal silica before being gathered by a vacuum forming method and subsequently fired at 600° C. to form a block in which the fibres or whiskers are bound together by silica. The block is then incorporated in an aluminium or aluminium alloy casting, by a squeeze casting process. The fired block, when prepared can be handled and is capable of light machining to form the compact into a required shape.

This process uses fibres or whiskers which are unprocessed and are of substantial length. It has been found, however, that reinforcements with improved properties can be prepared if the density of the fibres or whiskers is increased by milling the fibres or whiskers prior to the formation of the reinforcement.

However, before firing, such milled fibres or whiskers are much more difficult to handle and manipulate than unmilled fibres or whiskers, because of their short length. Accordingly, while the method of European Patent Specification No. 0094970 may be adequate for unmilled fibres or whiskers, it is unsatisfactory for milled fibres or whiskers, because it does not allow such milled fibres or whiskers to be handled prior to the formation of the reinforcement. In addition, milled fibres or whiskers in colloidal silica are subject to problems of settling, which can prevent the colloidal silica and the milled fibres or whiskers achieving an even dispersion and this, in turn, can lead to difficulties in the formation of the reinforcement.

Other binders proposed in the prior art include wax, in U.S. Pat. No. 4,312,398, and solder, in U.K. Patent Specification No. 2,096,932. Japanese Patent Specification No. 111565 proposes the alignment of fibre bundles using water or organic solvents. The incorporation of fibres or whiskers into matrices of aluminium or aluminium alloy is shown in U.K. Patent Specification No. 2,033,805 and U.K. Patent Specification No. 2,106,433.

It is an object of the invention to provide a method of manufacturing a reinforcement for incorporation in a cast article in which the problem of handling milled fibres or whiskers, prior to their formation, is overcome or mitigated.

It is a further object of the invention to provide such a method in which the milled fibres or whiskers are evenly dispersed throughout the reinforcement.

According to a first aspect of the invention, there is provided a method of manufacturing a reinforcement for incorporation in a cast article of metal or metal alloy, and comprising milling fibres or whiskers, dispersing a mass of milled fibres or whiskers in a solution of colloidal silica, adding starch to the dispersed milled fibres or whiskers in said colloidal silica solution to prevent settling, adding latex to the dispersed milled fibres or whiskers in said colloidal silica solution, precipitating said latex to bind the milled fibres or whiskers together, forming said latex bound milled fibres or whiskers into a reinforcement, drying the reinforcement, and firing the compact to disperse the latex and to leave the milled fibres or whiskers of the reinforcement bound together by said silica.

According to a second aspect of the invention there is provided a method of manufacturing a piston for an internal combustion engine comprising placing in a casting mould a reinforcement according to the first aspect of the invention and introducing into said mould under gravity a molten material selected from aluminium or an aluminium alloy, closing said mould, applying pressure to said molten material to force said molten material into said reinforcement, solidifying said molten metal under said pressure to form said piston.

Figure 2:
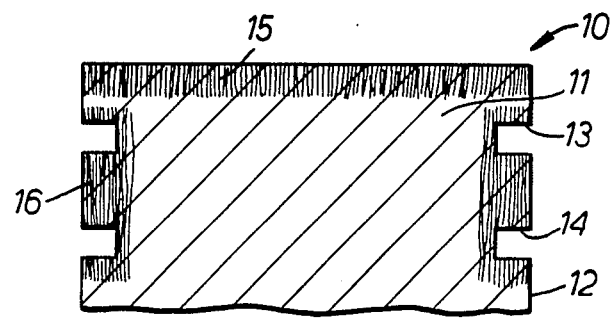
Figure 4:
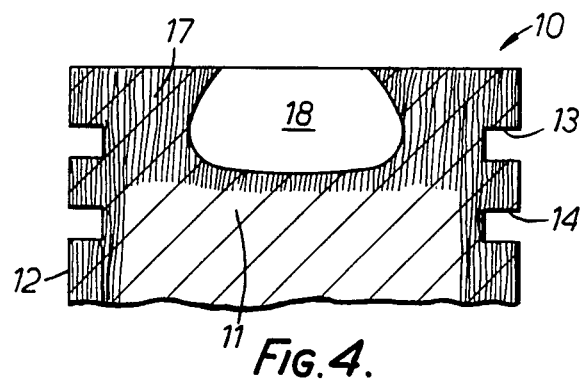

The following is a more detailed description of some embodiments of the invention, by way of example, reference being made to the accompanying drawings in which:

FIG. 1 is a schematic side elevation of a reinforcement for an article of cast metal or metal alloy, FIG. 2 is a vertical cross-section through part of the first form of reinforced cast piston for an internal combustion engine, FIGS. 3A, 3B, 3C, 3D and 3E show respective cross-sections of further shapes of reinforcement for incorporation in a piston for an internal combustion engine, and FIG. 4 is a vertical cross-section through part of a second form of reinforced cast piston for an internal combustion engine.

A reinforcement is prepared from an assembly of fibres or whiskers. These may be alumina whiskers of the kind described in British Patent Specification No. 1,489,346 or may be alumina fibres having a diameter of between 1 and 5 micrometers and a length 100 to 1000 times their diameter. Such fibres are sold under the trade mark Saffil. Alternatively, the fibres or whiskers may be a mixture of alumina or silica fibres. The mixture may be that sold under the trade mark Kaowool in which the proportions are 45% alumina fibres and 55% silica fibres, although other relative proportions may be used. For example, there may be between 40% and 80% of alumina fibres, with the remainder being silica fibres. First, a quantity of fibres or whiskers are milled to reduce their length substantially. For example, the maximum length of the milled fibres or whiskers may be 500 microns.

Next, the milled fibres or whiskers are dispersed in a solution of colloidal silica. When dispersion is complete, a starch solution is added. The action of the starch solution is to prevent settling of the milled fibres or whiskers in the solution and so ensure a homegenous dispersion.

A retention aid is then added, which acts to charge the milled fibres electrostatically, so keeping them in suspension by mutual repulsion. This is followed by the addition of a solution of latex. The resulting mixture is agitated and the latex is then precipitated.

This precipitation of the latex allows the mass of milled fibres or whiskers to be handled sufficiently to enable it to be shaped roughly and formed into a reinforcement by sandwiching the drained milled fibres or whiskers between gauzes and applying a pressure of 200 p.s.i. After compression, the drained reinforcement is dried and then fired. The firing step disperses the latex from the reinforcement so formed and leaves the milled fibres or whiskers held together by silica.

It has been found that the use of latex binds the milled fibres or whiskers to a sufficient extent to allow them to be handled prior to the firing step. This makes the processing of the milled fibres or whiskers easier to this stage and may also allow some initial shaping to the reinforcement to be performed prior to firing.

The use of starch ensures a homogenous dispersion of the milled fibres or whiskers in the colloidal silica solution and so ensures that, on firing, the milled fibres or whiskers are uniformly bound together.

An example of a method the kind described above will now be given.

Alumina fibres of the kind sold under the trade mark Saffil are taken. The fibres are first milled to reduce their length.

Next, 25 liters of water are taken for each kilogram of milled Saffil fibres. To each 25 liters of water, 40 ml of a colloidal silica sold under the trade mark Nalfloc N1030W are added. To this solution of colloidal silica, the milled Saffil fibres are added and are evenly dispersed using gentle agitation. While continuing the gentle agitation, 400 ml of a 2.5% w/w starch solution are added for each 25 liters of water.

Next, a solution of a retention aid sold under the trade mark Percol by Allied Colloids, is prepared by wetting the solid with industrial methylated spirits, mixing in a ratio of about 3 ml of industrial methylated spirits to 0.5 grammes of Percol and the preparing a 0.5% w/w solution. 470 ml of this solution are added for each 25 liters of water. The agitation is maintained and 20 grammes are added of a 50% solution of a latex sold under the trade name Ciago Hycar obtained from the B.F. Goodrich Company. After further gentle stirring, hydrochloric acid is added to precipitate the latex with a pH of 3. The handleable mass of milled fibres or whiskers so formed is sandwiched between two 60 mesh gauzes and a pressure of 200 p.s.i. is applied to form the contact with a final density of about 0.6 grammes/cc. The compact is then dried to constant weight at a temperature of 110° C. and fired at 1,200° C. for 20 minutes before being air cooled.

The reinforcement so prepared, while not of exceptional strength, is sufficiently strong to allow it to be handled and to be lightly machined or cut. Thus, the mass can be shaped into any required shape such as a disc, as shown in FIG. 1, for forming the crown reinforcement 15 of a piston for an internal combustion engine or as an annulus (not shown) to form the piston ring groove reinforcement 16 of such a piston. As shown in FIGS. 1 and 2, the piston is cast in aluminium or aluminium alloy and has a crown 11 and a skirt 12 including piston ring grooves 13, 14. The crown 11 and the portin of the piston including the piston ring grooves 13, 14 are reinforced by respective reinforcements 15, 16 of fibres or whiskers to reinforce these portions against the effects of heat and or wear.

Figure 3A:
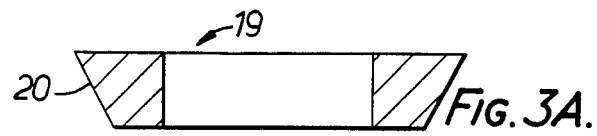
Figure 3B:
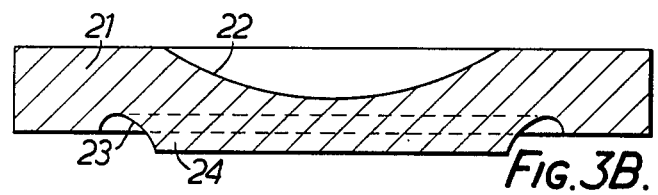

Other shapes which can be produced are shown in FIGS. 3A to 3E. The reinforcement of FIG. 3A is an annular reinforcement 19 for the periphery of a crown with a tapered outer surface 20. The reinforcement of FIG. 3B is a disc-like reinforcement 21 formed with a part-spherical depression 22 in the upper surface and an annular groove 23 in the lower surface. Inwardly of the groove 23, the reinforcement 21 is provided with an annular projection 24. This reinforcement 21 is for incorporation in a crown of a piston with the depression 22 defining a combustion bowl and the remainder providing a general reinforcement of the crown region.

Figure 3C:
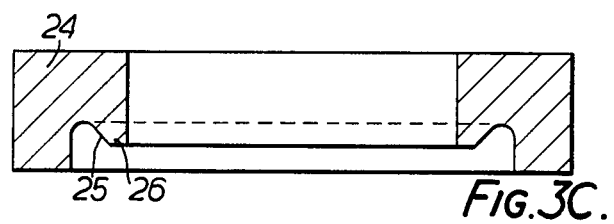
Figure 3D:
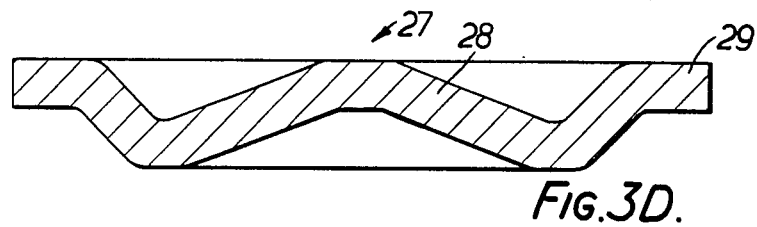

The reinforcement of FIG. 3C is an annular reinforcement 24 with a groove 25 around the under surface which forms an annular rib 26 adjacent the interior of the reinforcement. This reinforcement is for reinforcing the periphery of the crown of a piston. The reinforcement 27 of FIG. 3D is in the form of a disc bent to provide a central frusto-conical projection 28 surrounded by an annular flange 29. The reinforcement 27 is incorporated into the crown of a piston with the surface of the projection defining a combustion bowl and the flange 29 reinforcing the edge of the crown.

Figure 3E:
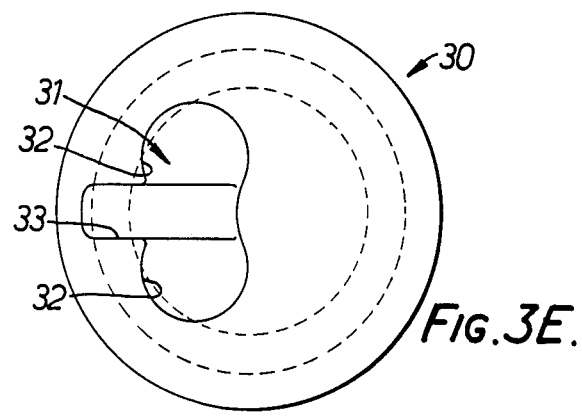

The reinforcement 30 of FIG. 3E is in the form of a disc provided on its upper surface with a depression 31 having two part-circular portions 32 separated by an elongate channel 32. The reinforcement 30 is incorporated in the crown of a piston with the depression 31 defining a combustion chamber for ensuring efficient combustion of the fuel/air mixture.

The reinforcements 15, 16 (or any of the reinforcements of FIGS. 3A to 3E) are then positioned in a mould of a squeeze casting apparatus. Molten aluminium or aluminium alloy is then fed into the mould and solidified under a force of, for example, 3 or more tonnes. This pressure forces the molten metal into the reinforcements 15, the molten metal or metal alloy passing through the voids between the individual fibres or whiskers.

The strength of the silica and the presence of the voids ensures that the reinforcement undergoes no or substantially no deformation so that there is no change in shape or volume during the squeeze casting and so that the fibres do not change their orientation relatively to one another.

In this way, a piston in squeeze cast which has the crown 11 reinforced with the milled whiskers or fibres and, in the case of the embodiments of FIG. 1, also has the ring band similarly reinforced. The piston ring grooves 12, 13 are then machined in the annular band and any necessary finish machining is performed at the same time. Thus, piston ring grooves are formed with increased wear resistance, due to the presence of the fibres or whiskers. In addition, the fibres or whiskers also form a band of low thermal conductivity in this region.

Referring next to FIG. 4, it will be seen that a reinforcement for the piston ring grooves and the crown may be formed in one piece 17 and that a combustion bowl 18 may be machined in the reinforced portion of the crown.

The milled alumina fibres or whiskers of the reinforcements provide the pistons with a crown 11, and with piston ring grooves 13, 14, when these are also reinforced, which are better able to withstand the effects of heat and wear than the aluminium or aluminium alloy of the piston itself. The use of milled fibres or whiskers gives the reinforced portions particularly good resistance to heat and wear.

It will be appreciated that although the reinforcement of the crown and/or the ring band of a piston have been described above with reference to the drawings, similarly formed reinforcements may be used elsewhere in a piston. For example, a reinforcement may be provided at a lower end of a skirt of a piston to strengthend and/or stiffen this open end. Such a reinforcement may also provide a wear resistant band in this region. Further, a reinforcement may be provided within the body of the piston in order to control the expansion of the piston.

It will be appreciated that articles other than pistons may be so reinforced. For example, other parts of engines or motors may be so reinforced as required or non engine or motor parts such as casings or housings may be so reinforced.

The metal or metal alloy need not be aluminium or aluminium alloy, magnesium or magnesium alloys may be used or any other suitable metal or metal alloy.

The whiskers or fibres need not be chosen for enhanced wear or heat resistance capabilities, they may be chosen for other desirable characteristics such as heat conductivity or strength improvement.

I claim:

1. A method of manufacturing a reinforcement for incorporation in a cast article of metal or metal alloy, and comprising:
    milling fibres or whiskers,
    dispersing a mass of milled fibres or whiskers in a solution of colloidal silica,
    adding starch to the dispersed milled fibres or whiskers in said colloidal silica solution to prevent settling,
    adding latex to the dispersed milled fibres or whiskers in said colloidal silica solution,
    precipitating said latex to bend the milled fibres or whiskers together,
    forming a compact of said latex bound milled fibres or whiskers,
    drying the compact, and
    firing the compact to disperse the latex and to leave the milled fibres or whiskers of the compact bound together, by said silica.

2. A method according to claim 1, wherein the latex is added in a 50% solution.

3. A method according to claim 1, wherein the latex is precipitated at a pH of 3.

4. A method according to claim 1 and further including the step of adding a retention aid prior to the addition of the latex.

5. A method according to claim 1, wherein the drying of the compact is at a temperature of 110° C.

6. A method according to claim 1, wherein the firing of the compact is at a temperature of 1200° C. and is for a time of 20 minutes.

7. A method according to claim 1, wherein the density of the milled fibres or whiskers in the reinforcement is 0.6 grammes/cc.

8. A method of manufacturing a piston for an internal combustion engine comprising:
    placing in a casting mould a reinforcement according to claim 1,
    introducing into said mould under gravity a molten material selected from aluminium or an aluminium alloy,
    closing said mould,
    applying pressure to said molten material to force said molten material into said reinforcement,
    solidifying said molten metal under said pressure to form said piston.

* * * * *